United States Patent [19]
Bisel

[11] Patent Number: 5,484,003
[45] Date of Patent: Jan. 16, 1996

[54] CHOP SAW TABLE

[76] Inventor: Neal O. Bisel, Rte. 1, Box 123, Okeene, Okla. 73763

[21] Appl. No.: 379,806

[22] Filed: Jan. 27, 1995

[51] Int. Cl.⁶ .................................. B25H 1/02; B27C 9/00
[52] U.S. Cl. ...................... 144/287; 83/471.2; 83/477.2; 83/581; 83/468.3; 144/286 A; 248/676
[58] Field of Search ............................... 144/1 R, 286 R, 144/286 A, 287; 83/471.2, 471.3, 477.2, 574, 581; 248/676, 677, 678

[56] References Cited

U.S. PATENT DOCUMENTS

| | | | |
|---|---|---|---|
| 2,763,301 | 9/1956 | Christopherson | 144/287 |
| 4,161,974 | 7/1979 | Patterson | 144/287 |
| 4,335,765 | 6/1982 | Murphy | 144/286 R |
| 4,694,720 | 9/1987 | Brickner, Jr. et al. | 144/286 R |
| 4,860,807 | 8/1989 | Vacchiani | 144/287 |
| 4,874,025 | 10/1989 | Cleveland | 144/287 |
| 4,974,651 | 12/1990 | Carmon et al. | 144/287 |
| 4,987,813 | 1/1991 | Viazanko | 83/471.3 |
| 5,004,029 | 4/1991 | Garner | 144/287 |
| 5,038,650 | 8/1991 | Hodge | 144/287 |
| 5,379,816 | 1/1995 | Charlton | 144/287 |

*Primary Examiner*—W. Donald Bray
*Attorney, Agent, or Firm*—Robert K. Rhea

[57] ABSTRACT

A workpiece support table forms a platform supporting a chop saw and workpieces at a convenient elevation for cutting metallic workpieces to length by an inverted channel member forming an elongated workpiece support which is transversely intersected by a recessed box-like member supporting the base of a chop saw in the plane of the workpiece surface. Triple legs depending in downward diverging relation from respective forward and rearward sides of the channel member supports the table on even or uneven surfaces and a horizontally pivoting arm guides workpieces in angular relation with respect to the vertical plane of a chop saw rotary blade moving toward and away from the workpiece table surface.

9 Claims, 2 Drawing Sheets

CHOP SAW TABLE

BACKGROUND OF THE INVENTION

1. Field of the Invention

This invention relates to chop saws and more particularly to a workpiece supporting table for chop saws.

A chop saw comprises a rotary saw axially connected with the drive shaft of a electric motor and supported by a housing pivotally mounted on a base for movement of the saw blade in a vertical plane toward and away from an underlying workpiece extending transversely across the base with respect to the vertical plane of movement of the saw blade for cutting metallic tubular and rod material to length.

Because of a chop saw mass and the mass of workpieces processed a chop saw is usually disposed on a floor or at ground level, thus minimizing forces necessary for moving workpieces to and from the processing position on the chop saw. However, many operations of a chop saw result in relatively short lengths of workpieces which can be relatively easily manually moved to and from stop positions under the chop saw.

This invention provides such a table for a chop saw and its workpieces.

2. Description of the Prior Art

The prior art generally relates to stands for table, radial, and miter wood saws.

U.S. Pat. No. 4,874,025 issued Oct. 17, 1989 to Cleveland for MITER SAW UTILITY STAND, U.S. Pat. No. 4,987,813 issued Jan. 29, 1991 to Viazanko for APPARATUS FOR INSTALLATION OF A POWER SAW AND FENCE IN A TABLE, and U.S. Pat. No. 5,004,029 issued Apr. 2, 1991 to Garner for SAW TABLE APPARATUS generally represent the state-of-the-art.

Each of the patents disclose a power driven rotary saw supported by a central recess in a frame or plate having wing members projecting in opposing directions normal to the vertical plane of the saw blade. The respective wing members may be rigid as in the Viazanko patent or capable of folding downwardly as in the Cleveland and Garner patent.

This invention provides a three leg work table which supports a chop saw medially its length and provides a horizontal workpiece platform extending in opposing directions normal to the vertical plane of the chop saw blade including vertically adjustable workpiece fences for guiding workpieces while processed by the chop saw.

SUMMARY OF THE INVENTION

An elongated workpiece support table is formed by the bight portion of an inverted U-shaped channel member supported by downwardly diverging tripod-type legs. An upwardly open rectangular box-like member is transversely interposed in the table top portion medially its length with the top plane of its side walls lying in the plane of the top surface of the table and its bottom comprising a horizontal plate projecting beyond both sides of the channel member and lying in a plane below the table top surface, a distance equal to the vertical thickness of a chop saw base when the latter is disposed within the box member.

A clamp secured to the box member rigidly engages the chop saw base and maintains the plane of the chop saw blade normal to the longitudinal axis of a workpiece extending longitudinally on the support surface. A workpiece guide and stop pivotally connected with the workpiece table supports workpieces at a selected angular position relative to the plane of the chop saw blade.

The principal objects of this invention are to provide a work table supporting a chop saw and its workpieces at a convenient working level on a planar or irregular surface by tripod-type legs which includes vertically adjustable guide fences and an angularly positionable workpiece cutoff support.

DESCRIPTION OF THE PREFERRED EMBODIMENTS

Figure 1:
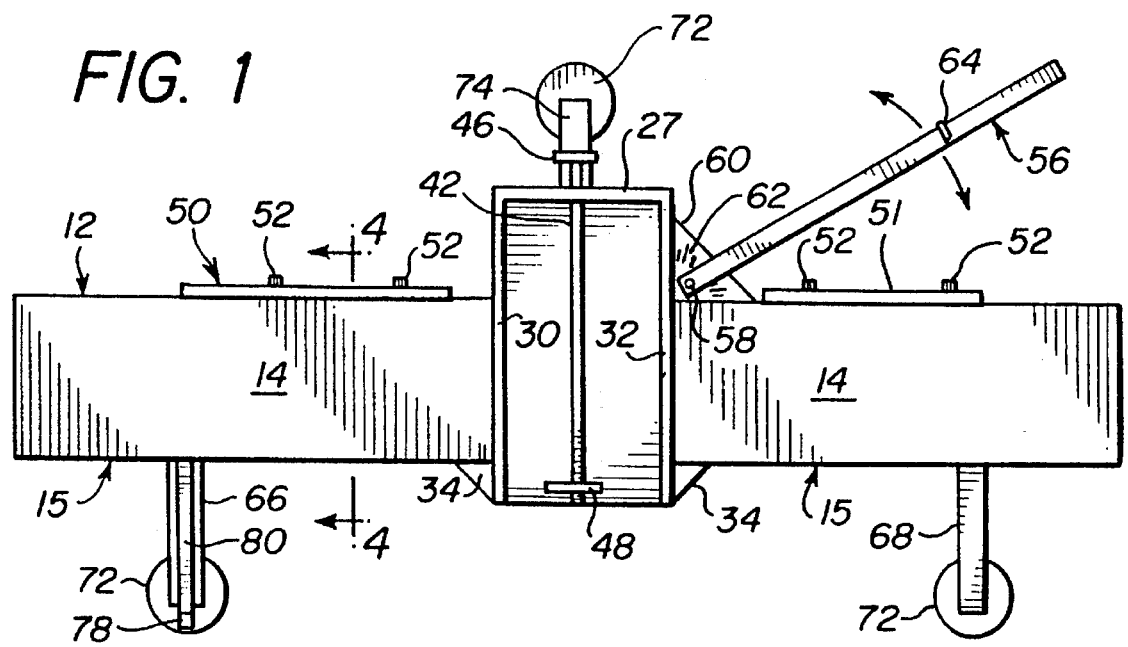
FIG. 1 is a top view of the table.
Figure 2:
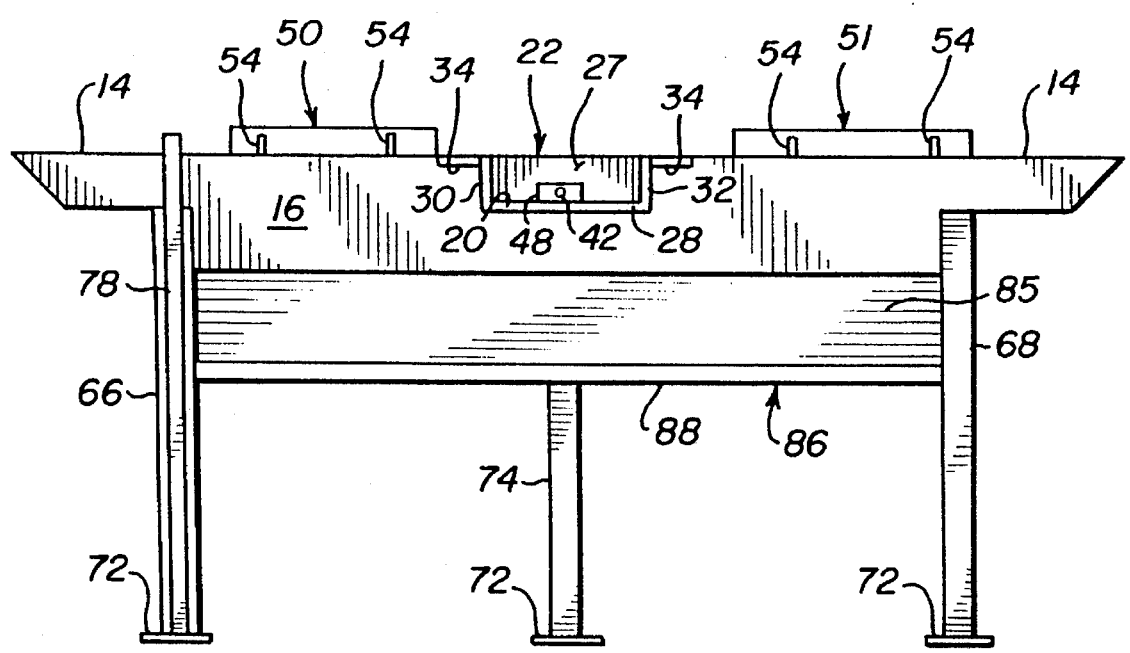
FIG. 2 is a front elevational view.

Like characters of reference designate like parts in those figures of the drawings in which they occur.

The reference numeral 10 indicates the three leg supported table which is bench-like in general configuration. The table 10 is formed by an elongated inverted U-shaped channel member 12 having a bight portion 14 and depending forward and rearward legs 16 and 18, respectively, and respectively forming table front and rearward sides and forming a horizontal workpiece support platform which is transversely intersected intermediate its ends by a recess 20 extending downwardly into the respective leg 16 and 18 and forming workpiece support end portions 15.

The recess 20 receives an open box-like member 22 projecting beyond the channel walls 16 and 18 a selected distance and is rigidly secured to the respective channel leg 16 and 18. The side walls 30 and 32 of the box-like member terminate upwardly in the plane of the workpiece support end portions 15 for reasons which will presently be apparent. A pair of gussets 34 rigidly secure the box walls 30 and 32 to the adjacent surface of the channel leg 16. The other end portion 26 of the box member is closed by an end panel 27.

Figure 3:
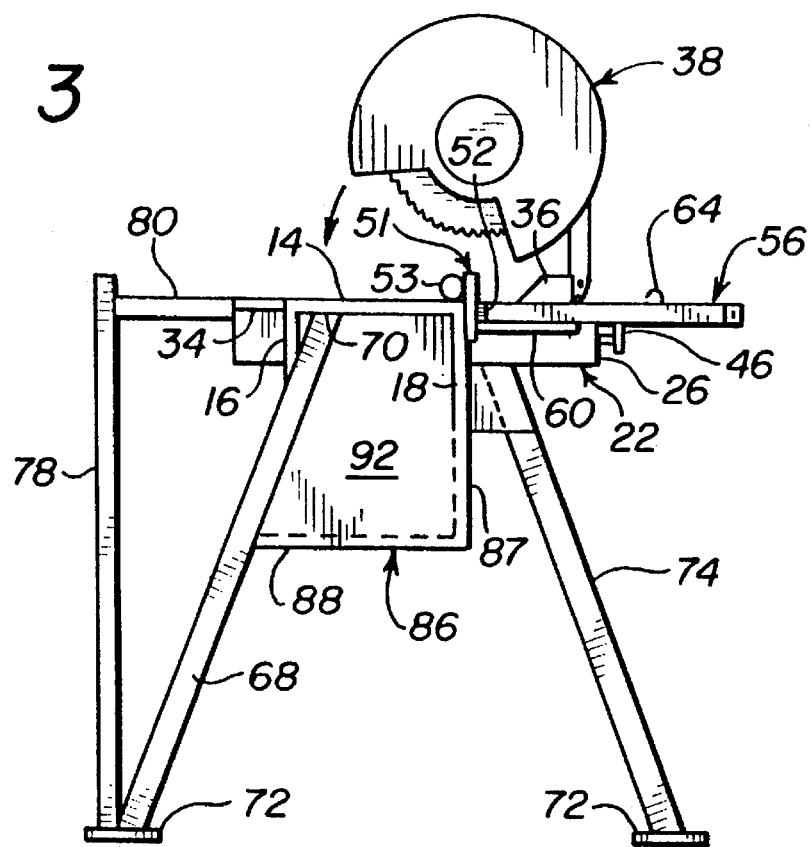
FIG. 3 is a right end elevational view of FIG. 2 illustrating the relative position of a chop saw when supported by the workpiece support table; and, FIG. 4 is a fragmentary vertical cross section view taken substantially along the line 4—4 of FIG. 1.
Figure 4:
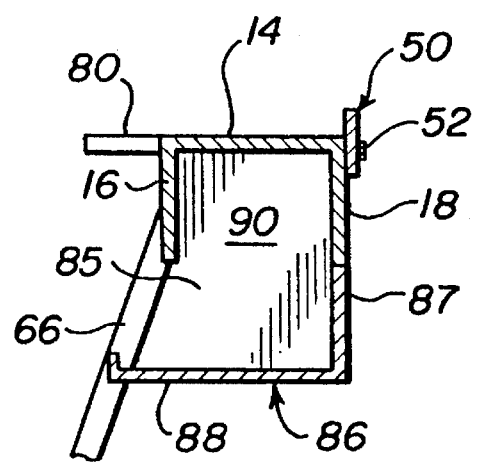

The purpose of the recessed box 22 is to support the base 36 of a chop saw 38 (FIG. 3). The box walls 30 and 32 closely receive the respective sides of the saw base to insure that the chop saw rotary blade 40 is normal to the longitudinal axis of the workpiece end portions 15. The chop saw base 36 is anchored in the box member 22 by a clamp means 42.

The clamp means 42 comprises an elongated threaded rod 44 projecting at one end portion through and journaled by the end wall 27 and provided with a handle 46 for angularly rotating the rod 44 in opposing directions. The other end portion of the rod 44 is threadedly connected with a clamp plate 48 moved toward and away from the adjacent end of chop saw base 36 by angular rotation of the handle 46 to clamp the chop saw base in the box member 22 or release the chop saw base for removal from the chop saw table 10.

A pair of elongated planar workpiece fences 50 and 51 are vertically adjustably secured to the channel leg 18 intermediate the ends of the respective workpiece platform 15 by bolts or screws 52 projecting through vertical slots 54 formed in respective end portion of the respective fence 50 and 51 which permit the longitudinal upper edge surface of the respective fence 50 or 51 to be disposed in the plane of the workpiece supporting platform 15 or project therein-above a selected distance for maintaining an elongated workpiece 53 axis (FIG. 3) normal to the plane of the chop saw blade 40.

An elongated arm 56 is pivotly connected, as by a pin 58, at one end portion with a web 60 extending rigidly between the channel wall 18 and adjacent surface of the box leg 32 for pivoting movement of the other end portion of the arm 56 about the vertical axis of its pin 58 from a position parallel with and adjacent the channel leg 18 to a position adjacent the vertical plane of the box wall 32.

The purpose of the arm 56 is to guide a workpiece in forming angular cuts thereon by the chop saw 38. The angular position being determined by indica 62 scored on the web 60. The arm 56 is further provided with a stop 64 for maintaining an accurate measurement between successive workpieces acted on.

A pair of legs 66 and 68 are respectively connected at their upper end to the depending surface of the channel bight portion 14 adjacent respective ends thereof and project downwardly and forwardly in parallel relation through the vertical plane of the forward or front wall leg 16 and are secured at their depending ends on horizontal pads 72.

Similarly, a third leg 74 is secured to the depending surface of the box bottom 28 and depends rearwardly and downwardly with respect to the vertical plane of the channel back leg 18 and is connected at its depending end with a similar support pad 72. The purpose of the support pads 72 are to prevent the legs 68 or 74 entering soft soil when the table 10 is disposed in the field.

The purpose of the triple leg arrangement is to assure that the table 10 will be supported in a rigid manner when disposed on uneven surfaces.

Additionally, an inverted L-shaped leg member which includes a vertically disposed leg 78 mounted on the pad of the table leg 66 and projecting upwardly slightly above the plane of the adjacent workpiece platform 15 where a foot member 80 is rigidly secured horizontally to the upper end portion of the leg 78 and its other end portion secured to the table front leg 16. The purpose of the inverted L-shaped member 76 is to support an end portion of a workpiece opposite the pivoting arm 56 or workpiece members projecting forwardly of the workpiece support platforms 15.

A tool storage compartment 85 is formed below the workpiece support platforms by an L-shaped member 86 extending between the front legs 66 and 68 and having a back wall 87 depending from the table back wall 18 and a horizontal leg portion 88 projecting forwardly and secured to the adjacent surface of the respective leg 66 and 68. The ends of the workpiece compartment 85 are closed by panels 90 and 92 secured to the adjacent inner surfaces of the channel legs 16 and 18 and the L-shaped member 86.

Operation

Operation seems obvious to those skilled in the art but briefly stated: Assuming the table 10 is constructed as described hereinabove and a chop saw 38 has its base 36 disposed in the box member and secured therein by the clamp means 42.

A workpiece such as the rod 53 is disposed longitudinally on the work supporting platforms 15 across the vertical path of the saw blade 40 when moved by pivoting the chop saw downwardly in the direction of the arrow which cuts the workpiece 53.

Similarly, a workpiece may be cut on a desired angle by the support arm 56 supporting the workpiece at the desired angle relative to the vertical plane of the saw blade 40.

Obviously the invention is susceptible to changes or alterations without defeating its practicability. Therefore, I do not wish to be confined to the preferred embodiment shown in the drawings and described herein.

I claim:

1. A workpiece support table for a chop saw having a base having parallel side edges and having a horizontal workpiece support surface underlying a rotary saw blade vertically movable toward and away from the workpiece support surface, comprising:

an elongated inverted U-shaped member having depending parallel channel legs respectively forming a table front side and a table rearward side, said member having a planar bight portion forming a horizontal workpiece supporting surface, said bight portion having a transverse recess, intermediate its ends, open at each end through the respective channel leg for closely nesting respective side edges of the chop saw base and disposing the plane of the chop saw rotary blade normal to the longitudinal axis of the U-shaped member and disposing the chop saw base workpiece surface in the plane of the bight portion workpiece supporting surface;

a pair of table front legs respectively secured to respective end portions of said U-shaped member and projecting laterally downward and outwardly in parallel relation with respect to the vertical plane of the forward channel leg of said U-shaped member; and, a table rearward leg secured to the medial portion of said U-shaped member and projecting laterally downward and outwardly with respect to the vertical plane of the rearward channel leg.

2. The support table according to claim 1 and further including:

an elongated workpiece guide pivotally connected at one end portion with the rearward portion of said member adjacent the chop saw for horizontal swinging movement of its other end portion toward and away from the rearward channel leg of said member for angularly disposing the longitudinal axis of a workpiece relative to the plane of the chop saw rotary blade.

3. The support table according to claim 2 and further including:

a workpiece fence vertically adjustably secured to the rearward channel leg on opposite sides of said chop saw.

4. The support table according to claim 3 and further including:

an inverted L-shaped brace secured to the table front leg opposite the position of said guide for forming a workpiece support surface extension in the horizontal plane of and forwardly of the bight portion support surface.

5. A workpiece support table for a chop saw having a base having parallel side edges and having a horizontal workpiece support surface underlying a rotary saw blade vertically movable toward and away from the workpiece support surface, comprising:

an elongated inverted U-shaped member having depending parallel channel legs respectively forming a table front side and a table rearward side, said member having a planar bight portion forming a horizontal workpiece supporting surface, said bight portion having a transverse recess, intermediate its ends, open at each end through the respective channel leg;

clamp means in the recess and secured to said U-shaped member for closely nesting respective side edges of the chop saw base and gripping said chop saw base and disposing the plane of the chop saw rotary blade normal to the longitudinal axis of the U-shaped member and disposing the chop saw base workpiece surface in the plane of the bight portion workpiece supporting surface;

a pair of table front legs respectively secured to respective end portions of said U-shaped member and projecting laterally downward and outwardly in parallel relation with respect to the vertical plane of the forward channel leg of said U-shaped member; and, a table rearward leg secured to the medial portion of said U-shaped member and projecting laterally downward and outwardly with respect to the vertical plane of the rearward channel leg.

6. The support table according to claim 5 in which the clamp means comprises:

an upwardly open box-like member having one end panel and projecting at its respective ends beyond the forward and rearward channel legs;

a rod journalled at one end portion by the box member end panel and threadedly connected at its other end portion with a chop saw base clamp plate; and, a handle for angularly rotating the rod and moving the clamp plate toward and away from the chop saw base.

7. The support table according to claim 6 and further including:

an elongated workpiece guide pivotally connected at one end portion with the rearward portion of said member adjacent the chop saw for horizontal swinging movement of its other end portion toward and away from the rearward channel leg of said member for angularly disposing the longitudinal axis of a workpiece relative to the plane of the chop saw rotary blade.

8. The support table according to claim 7 and further including:

a workpiece fence vertically adjustably secured to the rearward channel leg on opposite sides of said chop saw.

9. The support table according to claim 8 and further including:

an inverted L-shaped brace secured to the table front leg opposite the position of said guide for forming a workpiece support surface extension in the horizontal plane of and forwardly of the bight portion support surface.

* * * * *